US011371601B2

(12) United States Patent
Suzuki

(10) Patent No.: US 11,371,601 B2
(45) Date of Patent: Jun. 28, 2022

(54) LUBRICATION DEVICE AND CAM MECHANISM PROVIDED WITH LUBRICATION DEVICE

(71) Applicant: SANKYO SEISAKUSHO CO., Tokyo (JP)

(72) Inventor: Kengo Suzuki, Kikugawa (JP)

(73) Assignee: SANKYO SEISAKUSHO CO., Tokyo (JP)

( * ) Notice: Subject to any disclaimer, the term of this patent is extended or adjusted under 35 U.S.C. 154(b) by 2 days.

(21) Appl. No.: 16/966,139

(22) PCT Filed: Jan. 29, 2019

(86) PCT No.: PCT/JP2019/002904
§ 371 (c)(1),
(2) Date: Jul. 30, 2020

(87) PCT Pub. No.: WO2019/151219
PCT Pub. Date: Aug. 8, 2019

(65) Prior Publication Data
US 2021/0025487 A1    Jan. 28, 2021

(30) Foreign Application Priority Data
Jan. 31, 2018  (JP) .............................. JP2018-014806

(51) Int. Cl.
*F16H 21/12*  (2006.01)
*F16H 21/48*  (2006.01)
(Continued)

(52) U.S. Cl.
CPC ....... *F16H 57/0471* (2013.01); *F16C 33/106* (2013.01); *F16H 25/04* (2013.01);
(Continued)

(58) Field of Classification Search
CPC .... F16H 57/0471; F16H 27/045; F16H 1/166; B23Q 16/025
See application file for complete search history.

(56) References Cited

U.S. PATENT DOCUMENTS 4,797,011 A     1/1989  Saeki et al.
7,793,567 B2 *  9/2010  Kato ................... B23Q 16/025
                                                74/813 L
(Continued)

FOREIGN PATENT DOCUMENTS

CN      105499051 A     4/2016
CN      106594058 A     4/2017
(Continued)

OTHER PUBLICATIONS

Office Action dated Jul. 21, 2021 in corresponding Chinese Application No. 20198006770.8.
(Continued)

*Primary Examiner* — Jake Cook
(74) *Attorney, Agent, or Firm* — Harness, Dickey & Pierce, P.L.C.

(57) ABSTRACT

The present invention provides a lubrication device for coating a lubricant onto the outer circumferential surface of a bearing. A lubrication device comprises a housing and a lubrication member that is accommodated within the housing. A bearing crosses and passes through the lubrication member so that an outer circumferential surface of the bearing comes into contact with an inner surface of the lubrication member, and due to this configuration, it becomes possible for the lubricant to be coated onto the outer circumferential surface of the bearing.

9 Claims, 4 Drawing Sheets

(51) Int. Cl.
  *F16H 25/08* (2006.01)
  *F16H 57/04* (2010.01)
  *F16C 33/10* (2006.01)
  *F16H 25/04* (2006.01)
  *F16H 57/02* (2012.01)

(52) U.S. Cl.
  CPC ........... *F16H 57/02* (2013.01); *F16H 57/041* (2013.01); *F16H 57/0487* (2013.01); *F16H 57/0464* (2013.01)

(56) References Cited

U.S. PATENT DOCUMENTS

| | | |
|---|---|---|
| 2002/0138959 A1 | 10/2002 | Kato |
| 2005/0150093 A1 | 7/2005 | Kato |
| 2007/0251764 A1 | 11/2007 | Tsuboi et al. |
| 2013/0263693 A1 | 10/2013 | Albrecht |

FOREIGN PATENT DOCUMENTS

| | | |
|---|---|---|
| DE | 102004007330 A1 | 9/2005 |
| EP | 1201353 A2 | 5/2002 |
| JP | 2002126958 A | 5/2002 |
| JP | 2004270876 A | 9/2004 |
| JP | 2014101989 A | 6/2014 |
| JP | 2017061977 A | 3/2017 |

OTHER PUBLICATIONS

Supplementary European Search Report dated Oct. 1, 2021 in corresponding European Application No. EP 19746939.
International Search Report (in English and Japanese) and Written Opinion of the International Searching Authority (in Japanese) issued in PCT/JP2019/002904, dated Apr. 9, 2019; ISA/JP.
Office Action dated Feb. 25, 2022 in corresponding Chinese Application No. 201980006770.8.
Office Action dated Apr. 28, 2022 in corresponding Taiwan Patent Application No. 108103557.

* cited by examiner

LUBRICATION DEVICE AND CAM MECHANISM PROVIDED WITH LUBRICATION DEVICE

CROSS REFERENCE TO RELATED APPLICATIONS

This application is a U.S. National Phase Application under 35 U.S.C. 371 of International Application No. PCT/JP2019/002904 filed on Jan. 29, 2019, which claims the benefit of priority from Japanese Patent Application No. 2018-014806 filed on Jan. 31, 2018. The entire disclosures of all of the above applications are incorporated herein by reference.

TECHNICAL FIELD

The present invention relates to a lubrication device of applying a lubricant to an outer circumferential surface of a bearing, and a cam mechanism including the lubrication device.

BACKGROUND ART

A cam mechanism is a mechanism of engaging a cam having a cam rib as one shaft and a bearing fixed to a rotation member as the other shaft so as to transmit power such that one shaft of the cam and the rotation member is an input shaft and the other shaft is an output shaft. A preload is generated on a contact surface between the bearing and the cam by manipulating a distance between the input shaft and the output shaft such that a backlash between an input and an output can be eliminated. The bearing is in contact with the cam, whereby a friction is generated between the bearing and the cam, and the bearing and the cam are worn.

Patent Literature 1 discloses a rotation transmission mechanism including a motor, a gear driven by the motor, a lubricant of cooling the gear, and a lubricant storage means of storing the lubricant and immersing the gear in the lubricant. The gear is configured with a first spur gear, a second spur gear, a driven shaft, a worm gear (or a roller gear cam), a warm wheel (or a turret where a plurality of bearings to be engaged with the roller gear cam are radially arranged around the turret at equal intervals), and a rotation shaft. The lubricant is stored in the lubricant storage means such that the first spur gear, the second spur gear, and the worm gear are completely immersed. A heat generated from the motor is transferred to the gear, and the transferred heat is transferred to the lubricant in which the gear is immersed, whereby the gear is cooled.

CITATION LIST

Patent Literature

PATENT LITERATURE 1: JP-A-2014-101989

SUMMARY OF INVENTION

Technical Problem

In the rotation transmission mechanism of Patent Literature 1, the lubrication of the gear is performed by the lubricant stored in the lubricant storage means. However, when the gear is driven by the motor such that the turret rotates via the roller gear cam, there is problem that a centrifugal force causes the lubricant to move away from the roller gear cam and the turret, and a film of the lubricant on a contact surface between the bearing and the cam does not remain. Moreover, when a large amount of the lubricant is stored in the lubricant storage means, there is a problem that a stirring resistance due to the lubricant increases such that a heat is generated. Further, there is a problem that when the lubricant storage means is filled with the lubricant, the lubricant may leak out of the lubricant storage means.

Therefore, an object of the present invention is to provide a lubrication device of applying a lubricant to an outer circumferential surface of a bearing in order to solve the above problems.

Solution to Problem

According to an aspect of the present invention, a lubrication device of applying a lubricant to an outer circumferential surface of a bearing includes a housing and a lubrication member that is accommodated within the housing. The lubrication device is configured to apply the lubricant to the outer circumferential surface of the bearing by passing the bearing across the lubrication member such that the outer circumferential surface of the bearing is in contact with an inner surface of the lubrication member.

According to a specific example of the present invention, in the lubrication device, when the outer circumferential surface of the bearing is not in contact with the inner surface of the lubrication member, an interval between the inner surfaces of the lubrication member is smaller than an outer diameter of the outer circumferential surface of the bearing.

According to a specific example of the present invention, in the lubrication device, when the outer circumferential surface of the bearing is in contact with the inner surface of the lubrication member, the bearing presses the lubrication member, whereby the lubricant is applied to the outer circumferential surface of the bearing.

According to a specific example of the present invention, in the lubrication device, the lubrication member is a solid lubricant, or an absorbent member impregnated with a liquid lubricant.

According to a specific example of the present invention, the lubrication device further includes a lid, and the lubrication member is attachable to and detachable from the housing via the lid.

According to another aspect of the present invention, a cam mechanism includes a rotation member rotatable about a rotation member axis, a plurality of bearings fixed to the rotation member, and a cam housing of accommodating the rotation member and the plurality of bearings. The cam mechanism further includes the above lubrication device mounted to the cam housing. As the rotation member rotates about the rotation member axis, the plurality of bearings rotate about the rotation member axis such that the plurality of bearings pass continuously across the lubrication device.

According to a specific example of the present invention, the cam mechanism further includes a cam having a cam rib and rotatable about a cam axis. The plurality of bearings pass across the lubrication device, whereby the lubricant applied to the outer circumferential surface of each of the plurality of bearings is applied to the cam rib by a contact between each of the plurality of bearings and the cam rib.

According to a specific example of the present invention, in the cam mechanism, the lubrication device is configured to be mounted to and removed from the cam housing.

According to a specific example of the present invention, in the cam mechanism, each of the plurality of bearings includes an inner ring portion and an outer ring portion rotatable around the inner ring portion. An outer circumferential surface of the outer ring portion is the outer circumferential surface of the bearing.

According to a specific example of the present invention, in the cam mechanism, each of the plurality of bearings is a rolling contact bearing or a sliding contact bearing.

Advantageous Effect of Invention

According to the present invention, the lubrication device applies the lubricant to the outer circumferential surface of the bearing, whereby a film of the lubricant can be ensured on a contact surface between the bearing and the cam, whereby the bearing can be further in contact with the cam smoothly to reduce the wear of the bearing and the cam.

Other objects, features and advantages of the present invention will become apparent from the following description of the embodiments of the present invention taken in conjunction with the accompanying drawings.

DESCRIPTION OF EMBODIMENTS

Embodiments according to the present invention will be described with reference to the drawings. However, the present invention is not limited to those embodiments.

Figure 1:
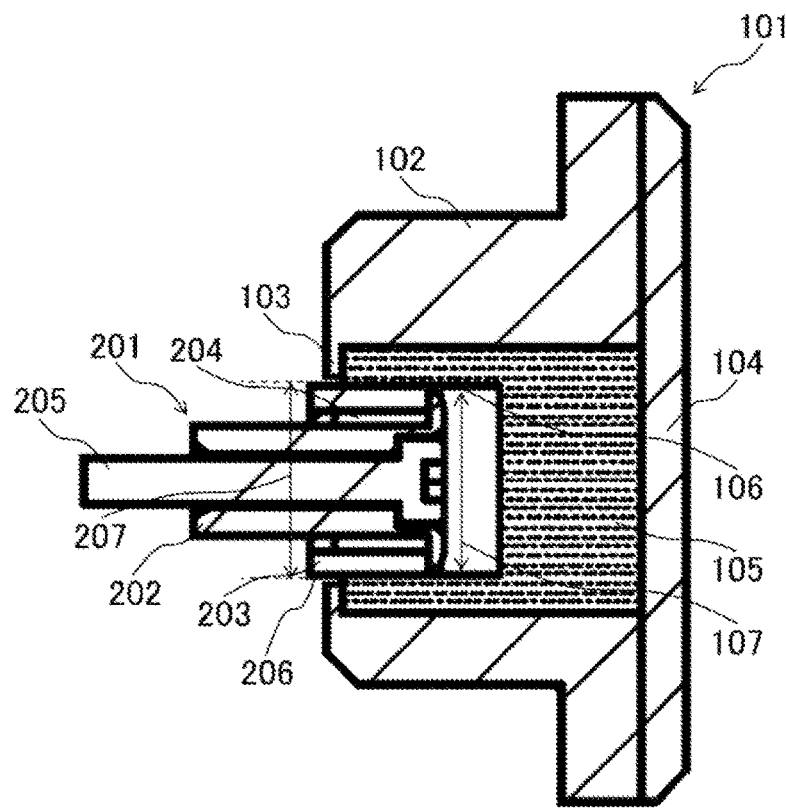
FIG. 1 is a cross-sectional view when a lubrication device as an embodiment of the present invention is in contact with a bearing.
Figure 2:
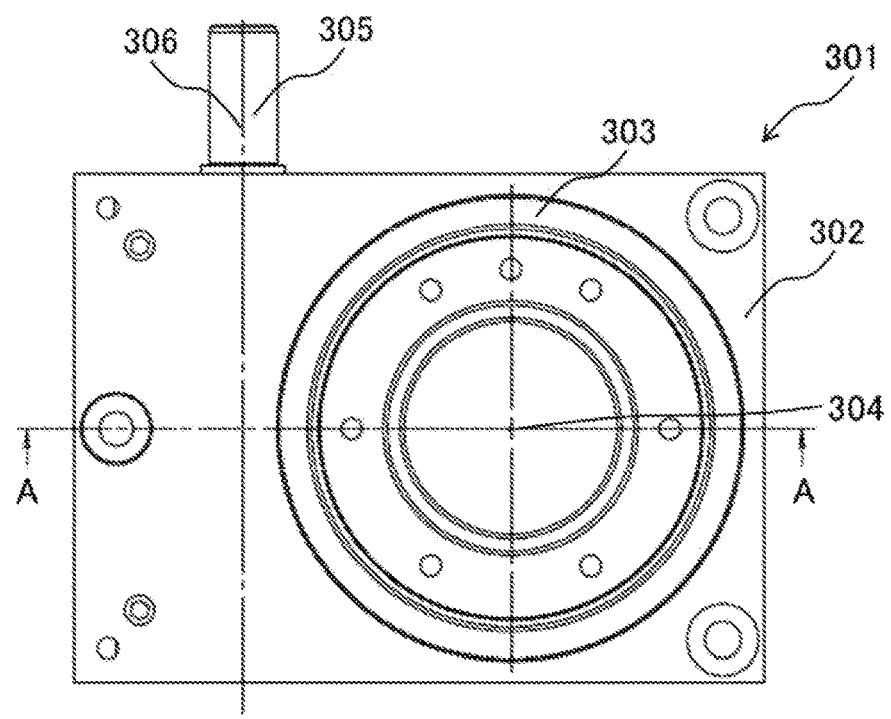
FIG. 2 is a plan view of a cam mechanism as an embodiment before the lubrication device of FIG. 1 is mounted thereto.
Figure 3:
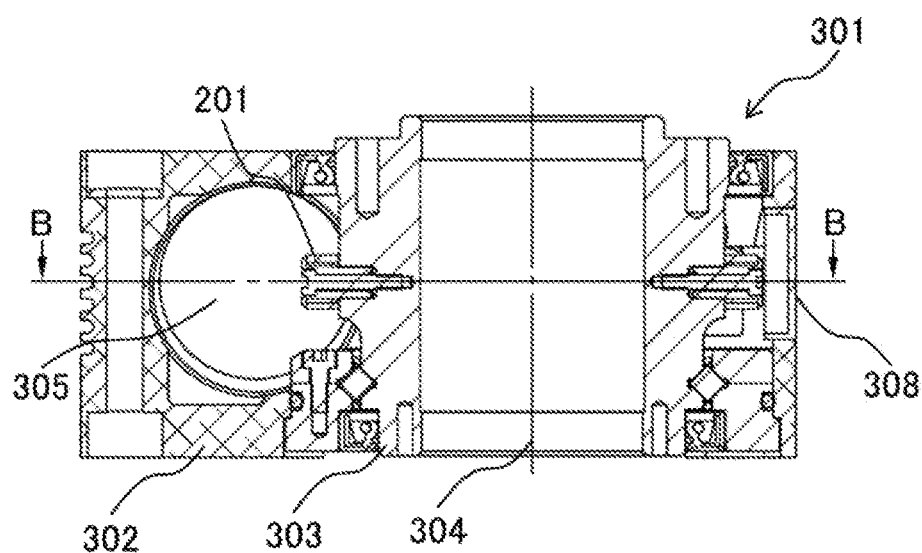
FIG. 3 is a cross-sectional view seen from the direction of the arrow along line A-A of the cam mechanism of FIG. 2.

An embodiment of the lubrication device 101 will be described with reference to FIG. 1. FIG. 1 shows a cross-sectional view of a lubrication device 101 of applying a lubricant to an outer circumferential surface 206 of a bearing 201. The lubrication device 101 includes a housing 102 and a lubrication member 105 accommodated within the housing 102. The lubricant is applied to the outer circumferential surface 206 of the bearing 201 by passing the bearing 201 across the lubrication member 105 such that the outer circumferential surface 206 of the bearing 201 being substantially cylindrical is in contact with an inner surface 106 of the lubrication member 105.

The lubrication member 105 may have a shape having a substantially U-shaped concave surface as shown in FIG. 1. The bearing 201 can pass across the inside of the lubrication member 105 between the upper side and the lower side of the substantially U-shape of the lubrication member 105, and when the bearing 201 passes through the inside of the lubrication member 105, the outer circumferential surface 206 of the bearing 201 is in contact with the lower surface side of the upper side and the upper surface side of the lower side, which correspond to the inner surfaces 106 of the lubrication member 105, such that the lubricant is applied to the outer circumferential surface 206 of the bearing 201. In addition, the lubrication member 105 shown in FIG. 1 has the substantially U-shape. However, if the lubricant can be applied to the outer circumferential surface 206 of the bearing 201 by passing the bearing 201 across the lubrication member 105, the lubrication member 105 may have any shape. For example, the lubrication member 105 may have only the upper side, only the lower side, or only the upper and lower sides of the substantially U-shape.

When the outer circumferential surface 206 of the bearing 201 is not in contact with the inner surface 106 of the lubrication member 105, an interval 107 between the inner surfaces 106 of the lubrication member 105 may be set so as to be smaller than an outer diameter 207 of the outer circumferential surface 206 of the bearing 201. Then, when the bearing 201 is passing across the lubrication member 105 such that the outer circumferential surface 206 of the bearing 201 is in contact with the inner surface 106 of the lubrication member 105, the bearing 201 can press the lubrication member 105, that is, the outer circumferential surface 206 of the bearing 201 can press the inner surface 106 of the lubrication member 105 since the interval 107 between the inner surfaces 106 of the lubrication member 105 is smaller than the outer diameter 207 of the outer circumferential surface 206 of the bearing 201, whereby the lubricant can be applied to the outer circumferential surface 206 of the bearing 201.

The lubrication member 105 may be a solid lubricant, or may be an absorbent member impregnated with a liquid lubricant such as grease, oil, or the like. The absorbent member is preferably a member having a high absorptivity to a liquid lubricant such as a sponge, a felt, or the like.

The lubrication device 101 further may be a lid 104. Although the lid 104 maintains the lubrication member 105 within the housing 102, the lid 104 may be detachable from the housing 102 or attachable to the housing 102. By detaching the lid 104 from the housing 102, the lubrication member 105 accommodated within the housing 102 can be taken out. Although the contact of the lubrication member 105 with the bearing 201 reduces the amount of lubricant in the lubrication member 105, it is possible to take out the lubrication member 105 from the housing 102 so as to replenish the lubrication member 105 with a lubricant and accommodate the lubrication member 105 within the housing 102 again, or replace the lubrication member 105 with a new lubrication member 105 and accommodate it within the housing 102. Moreover, the lubrication device 101 may include a flange 103 on the opposite side of the lid 104 so as to maintain the lubrication member 105 within the housing 102. In addition, as shown in FIG. 1, the flange 103 may be integrated with the housing 102.

Figure 4:
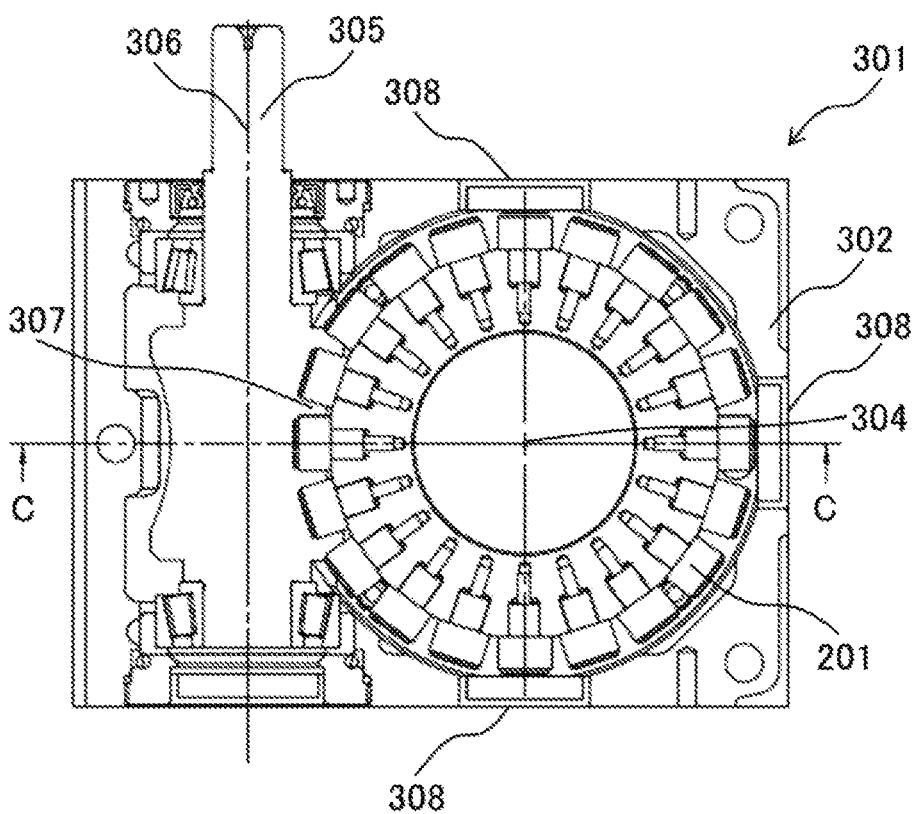
FIG. 4 is a cross-sectional view seen from the direction of the arrow along line B-B of FIG. 3 of the cam mechanism of FIG. 2.
Figure 5:
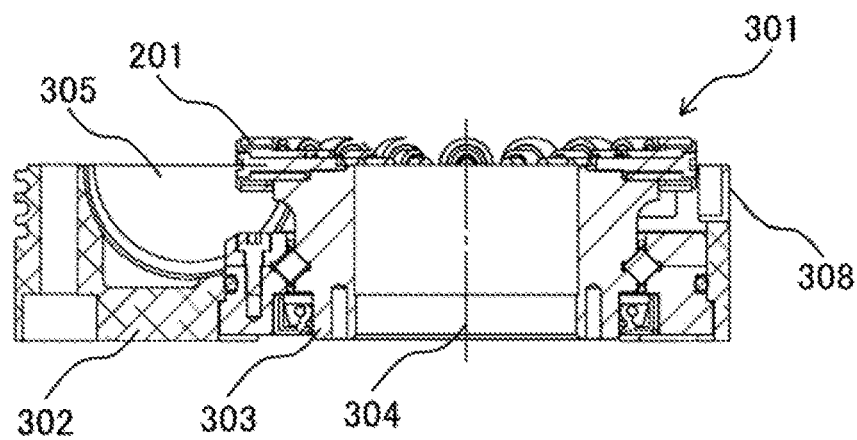
FIG. 5 is a cross-sectional view seen from the direction of the arrow along line C-C of the cam mechanism of FIG. 4.
Figure 6:
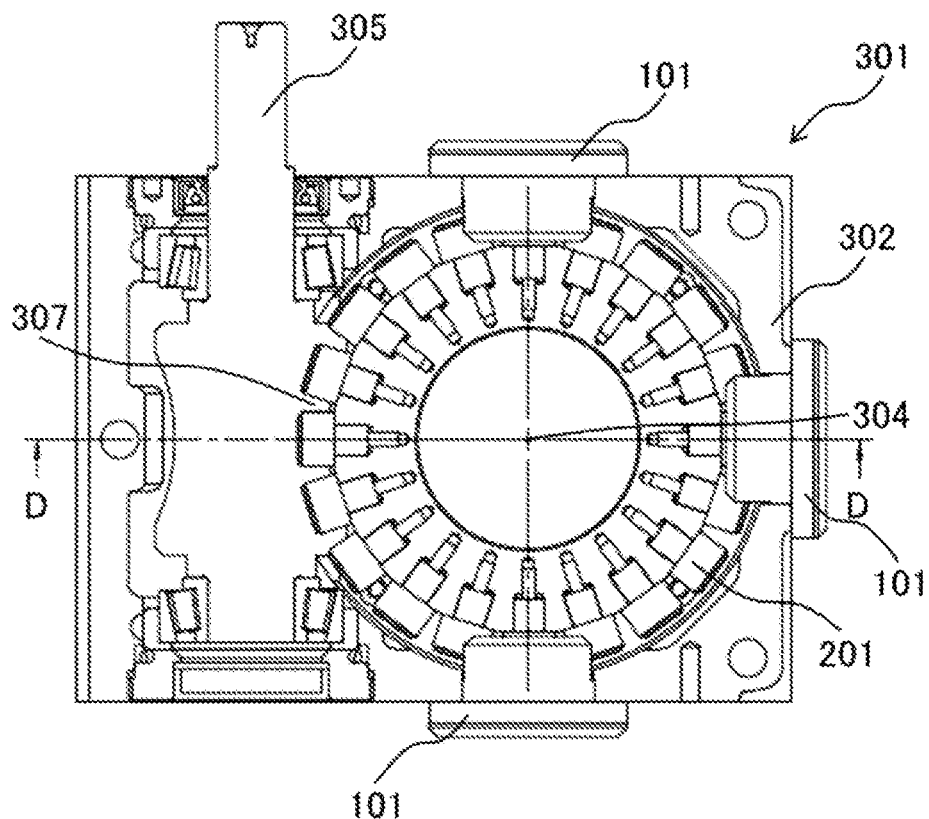
FIG. 6 is a plan view seen from the direction of the arrow along line B-B of FIG. 3 of a cam mechanism as an embodiment after the lubrication device of FIG. 1 is mounted thereto.
Figure 7:
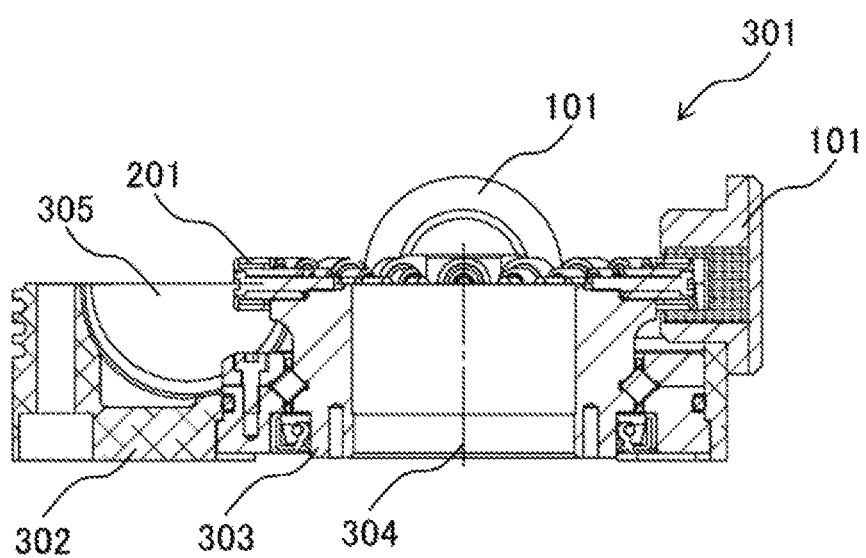
FIG. 7 is a cross-sectional view seen from the direction of the arrow along line D-D of the cam mechanism of FIG. 6.

An embodiment of a cam mechanism 301 to which the lubrication device 101 is mounted will be described with reference to FIGS. 2 to 7. The cam mechanism 301 includes a rotation member 303 rotatable about a rotation member axis 304, a plurality of bearings 201 fixed to the rotation member 303 by being fitted or the like, and a cam housing 302 of accommodating the rotation member 303 and the plurality of bearings 201. The rotation member 303 can rotate around the rotation member axis 304 with respect to the cam housing 302, and the plurality of bearings 201 fixed to the rotation member 303 also rotate about the rotation member axis 304 with respect to the cam housing 302 according to the rotation of the rotation member 303. The cam housing 302 is provided with at least one lubrication device mounting port 308, and the cam mechanism 301 further includes the lubrication device 101 mounted to the cam housing 302 via the lubrication device mounting port 308. As shown in FIG. 4, the cam housing 302 is provided with three lubrication device mounting ports 308. However, the number of lubrication device mounting ports 308 is arbitrary. Moreover, as shown in FIGS. 4 and 6, the lubrication device 101 is attached via each of the three lubrication device mounting ports 308 to the cam housing 302. However, the lubrication device 101 may be mounted only to any of the lubrication device mounting ports 308, and a location where the lubrication device 101 is attached is arbitrary.

When the plurality of bearings 201 rotate about the rotation member axis 304, the plurality of bearings 201 can pass continuously across the inside of the lubrication member 105 one after another, whereby the outer circumferential surface 206 of the bearing 201 is in contact with the inner surface 106 of the lubrication member 105 such that the lubricant is applied to the outer circumferential surface 206 of the bearing 201.

The cam mechanism 301 further includes a cam 305 having a cam rib 307, rotatable about a cam axis 306, and engaging with the bearing 201. One of the rotation member axis 304 and the cam axis 306 may be an input shaft, and the other may be an output shaft. As shown in FIGS. 2 to 7, the shape of the cam 305 may be a shape having a screw-shaped cam rib 307. For example, when the cam 305 rotates as the input shaft about the cam axis 306, the plurality of bearings 201 are continuously in contact with the cam lib 307 one after another such that the rotation member 303 can rotate as the output shaft about the rotation member axis 304 orthogonal to the cam axis 306. Then, when the rotation member 303 rotates, the plurality of bearings 201 pass continuously across the lubrication member 105 one after another, and the lubricant is applied to the outer circumferential surface 206 of the bearing 201. When the rotation member 303 further rotates, the plurality of bearings 201 with the lubricant applied to each outer circumferential surface 206 are continuously in contact with the cam rib 307 one after another such that the lubricant applied to the outer circumferential surfaces 206 of the bearings 201 is applied to the cam rib 307. In this way, a film of the lubricant is formed on the contact surface between the outer circumferential surface 206 of the bearing 201 and the cam rib 307 without filling the cam housing 302 with the lubricant such that the outer circumferential surfaces 206 of the bearings 201 can be in contact with the cam rib 307 smoothly, whereby the wear of the outer circumferential surface 206 of the bearing 201 and the cam rib 307 can be reduced, and further the life of the bearings 201 and the cam 305 can be extended. In addition, as shown in FIGS. 2 to 7, the plurality of bearings 201 may be fixed radially to the rotation member 303 on an outer circumferential surface of the substantially cylindrical rotation member 303 by being fitted or the like, and depending on the shape of the cam 305, the plurality of bearings 201 may be fixed circularly to the rotation member 303 on an end surface of the substantially cylindrical rotation member 303.

The lubrication device 101 mounted to the cam housing 302 via the lubrication device mounting port 308 can be removed from the cam housing 302. The removed lubrication device 101 can be mounted to the cam housing 302 again after the lubrication member 105 is taken out from the housing 102 so as to replenish the lubrication member 105 with a lubricant and accommodate the lubrication member 105 within the housing 102 again or replace the lubrication member 105 with a new lubrication member 105 and accommodate it within the housing 102, as described above. In this way, the lubrication device 101 can be mounted to or removed from the cam housing 302, whereby the lubrication device 101 can be reused so as to reduce the cost. Moreover, even if the cam housing 302 is not filled with a lubricant, a film of the lubricant can be ensured on the contact surface between the outer circumferential surface 206 of the bearing 201 and the cam rib 307 so as to facilitate the maintenance of the cam mechanism 301.

In addition, the contact states between the cam rib 307 and the bearing 201 are the same both in case that the cam 305 rotates the rotation member 303 as the input side and in case that the rotation member 303 rotates the cam 305 as the input side.

Each bearing 201 may include an inner ring portion 202 and a substantially cylindrical outer ring portion 203 rotatable around the inner ring portion 202 along a side surface of the inner ring portion 202. In this case, an outer circumferential surface of the outer ring portion 203 corresponds to the outer circumferential surface 206 of the bearing 201. The lubricant is applied to the outer circumferential surface 206 of the bearing 201, that is, the outer circumferential surface 206 of the outer ring portion 203 by passing the bearing 201 including the outer ring portion 203 across the lubrication device 101. Then, the bearing 201 to which the lubricant is applied rotates according to the rotation of the rotation member 303, whereby the bearing 201 is in contact with the cam rib 307. The bearing 201 is in contact with the cam rib 307, whereby the lubricant is applied to the cam rib 307, and the outer ring portion 203 can rotate around the inner ring portion 202 while making a smooth rolling contact with the cam rib 307. By making rolling contact between each bearing 201 and the cam rib 307, it is possible to improve a transmission efficiency of a torque input from the cam 305 or the rotation member 303 to the output shaft side and extend the life of the cam mechanism 301. Moreover, since each bearing 201 and the cam rib 307 are in line contact with each other, they have high rigidity against an external force in the rotation direction of the rotation member 303. Moreover, each bearing 201 may be a rolling contact bearing including rolling elements 204 such as rollers, needles, or the like between the inner ring portion 202 and the outer ring portion 203, or may be a sliding contact bearing that does not include the rolling elements 204.

Each bearing 201 may be a cam follower that includes a fixing member 205 of fixing each bearing 201 to the rotation member 303 inside the inner ring portion 202. The fixing member 205 is fitted to the rotation member 303, whereby each bearing 201 is fixed to the rotation member 303. Moreover, each bearing 201 may be a roller follower that does not include the fixing member 205. The fixing member 205 as a member separate from the bearing 201 penetrates the inside of the inner ring portion 202 so as to be fitted to the rotation member 303, whereby each bearing 201 is fixed to the rotation member 303.

If the lubricant can be applied to the outer circumferential surfaces 206 of the bearings 201 by passing the bearings 201 fixed to the rotation member 303 across the lubrication member 105 according to the rotation of the rotation member 303, the cam which is included in the cam mechanism 301 to which the lubrication device 101 is mounted is not limited to only the concave globoidal cam as shown in FIGS. 4 and 6, and may be another cam having another screw-shaped cam rib such as a cylindrical cam, a barrel cam, a convex globoidal cam, or the like.

Moreover, the cam mechanism 301 shown in FIGS. 2 to 7 is a circumscribed cam mechanism having a positional relation in which the cam 305 and the bearing 201 are in contact with each other within a width of a line connecting the cam axis 306 and the rotation member axis 304. However, the cam mechanism 301 is not limited hereto, and depending on the shape of the cam, it may be an inscribed cam mechanism having a positional relation in which a cam and a bearing are in contact with each other outside a width of a line connecting a cam axis and a rotation member axis. The inscribed cam mechanism may be, for example, an inscribed parallel cam, or the like in which the cam axis and the rotation member axis are parallel to each other.

It should be further understood by those skilled in the art that although the foregoing description has been made on embodiments of the present invention, the present invention is not limited thereto and various changes and modifications may be made without departing from the spirit of the present invention and the scope of the appended claims.

The invention claimed is:

1. A cam mechanism comprising a rotation member rotatable about a rotation member axis, a plurality of bearings fixed to the rotation member, and a cam housing accommodating the rotation member and the plurality of bearings, wherein:
 the cam mechanism further comprises at least one lubrication device mounted to the cam housing, wherein:
 the lubrication device comprises a housing and a lubrication member that is accommodated within the housing, and the rotation member rotates about the rotation member axis such that the plurality of bearings rotate about the rotation member axis, the lubrication device is configured to apply a lubricant to an outer circumferential surface of the bearing by passing the bearing across the lubrication device such that the outer circumferential surface of the bearing is in contact with an inner surface of the lubrication member.

2. The cam mechanism according to claim 1, wherein when the outer circumferential surface of the bearing is not in contact with the inner surface of the lubrication member, an interval between facing portions of the inner surface of the lubrication member is smaller than an outer diameter of the outer circumferential surface of the bearing.

3. The cam mechanism according to claim 2, wherein when the outer circumferential surface of the bearing is in contact with the inner surface of the lubrication member, the bearing presses the lubrication member, whereby the lubricant is applied to the outer circumferential surface of the bearing.

4. The cam mechanism according to claim 1, wherein the lubrication member is a solid lubricant, or an absorbent member impregnated with a liquid lubricant.

5. The cam mechanism according to claim 1, wherein the lubrication device further comprises a lid, and the lubrication member is attachable to and detachable from the housing via the lid.

6. The cam mechanism according to claim 1, wherein the cam mechanism further comprises a cam having a cam rib and rotatable about a cam axis, and the plurality of bearings pass across the lubrication device, whereby the lubricant applied to the outer circumferential surface of each of the plurality of bearings is applied to the cam rib by a contact between each of the plurality of bearings and the cam rib.

7. The cam mechanism according to claim 1, wherein the lubrication device is configured to be mounted to and removed from the cam housing.

8. The cam mechanism according to claim 1, wherein each of the plurality of bearings comprises an inner ring portion and an outer ring portion rotatable around the inner ring portion, and an outer circumferential surface of the outer ring portion is the outer circumferential surface of the bearing.

9. The cam mechanism according to claim 8, wherein each of the plurality of bearings is a rolling contact bearing or a sliding contact bearing.

* * * * *